UNITED STATES PATENT OFFICE.

CHARLES L. HEERMANN DE HUNDERTMARK, OF PARIS, FRANCE, ASSIGNOR TO WILHELM HERBST, OF BRUNSWICK, GERMANY.

FIREPROOF MATERIAL.

SPECIFICATION forming part of Letters Patent No. 623,247, dated April 18, 1899.

Application filed January 31, 1899. Serial No. 704,030. (No specimens.)

*To all whom it may concern:*

Be it known that I, CHARLES LEWIS HEERMANN DE HUNDERTMARK, engineer, a citizen of the United States of America, residing at 24 Avenue MacMahon, Paris, France, have invented new and useful Improvements in Fireproof Materials, of which the following is a specification.

The principal object of my invention is to provide a fireproof material for protecting buildings and the like as much as possible against injury in case of fire.

It is well known that the plaster ceilings, partitions, &c., which are now used in all constructions are no protection whatever for the iron bearers and steel framework with which American houses are built. With a fire in the next house the heat, if this fire is one of ten or twelve hours' duration, is so intense, that both neighbors' houses, by the torsion, contraction, or extension of all the framework, and particularly of the rafters supporting the ceilings, are utterly ruined by the falling of walls and ceilings.

A brick or stone of my new fireproof material or compound when put into the fire and left there for twenty hours shows on the surface only a very thin layer of cinders of about one-sixteenth of an inch thickness, and when broken open is cold inside, the heating of the outside wall of the stone never penetrating more than three-fourths of an inch and not being intense. Therefore any iron or steel bar covered with three inches of my new material could never be touched by any change of temperature.

The composition of said material is as follows: one hundred kilograms of water, forty-five to sixty kilograms of plaster finely crushed and well calcined, one to four kilograms of pulverized hydraulic lime, ten to twenty grams of sulfuric acid at 66° Baumé. Said substances being well mixed, I add ten to twenty-five per cent. of their total weight of chlorid of magnesium or any equivalent agent and thoroughly mix the whole. I then add to the mixture for each one hundred kilograms of water fourteen to twenty kilograms of sand, sawdust, slag, waste of wood, cork, &c., or any other inert and cheap residue which happens to be at hand. The mixture is then molded into sheets, blocks, or stones of any size or proportions and dried in the open air, and when dry is ready for use. It can be employed for erecting walls, partitions, or any kind of lining for iron or steel bearers or framework, or when making ceilings and the like the mixture, as aforesaid, of the different substances is made in a tub in very liquid form and the liquid then poured between the rafters or any other skeleton frame.

I am aware that it has been proposed to make bricks or stones composed in an analogous manner; but they are not in any way fireproof, so that they cannot answer my purpose.

I claim as my invention—

A fireproof material composed of one hundred kilograms of water, forty-five to sixty kilograms of plaster finely crushed, one to four kilograms of finely-pulverized hydraulic lime, ten to twenty grams of sulfuric acid at 66° Baumé, ten to twenty-five per cent. of the total weight of aforesaid components of chlorid of magnesium or equivalent, and finally for each one hundred kilograms of water, fourteen to twenty kilograms of any valueless residue or waste, substantially as and for the purpose set forth.

In testimony that I claim the foregoing as my invention I have signed my name, in presence of two witnesses, this 13th day of January, 1899.

CH. L. HEERMANN DE HUNDERTMARK.

Witnesses:
EDWARD P. MACLEAN,
ALCIOLE FABE.

Correction in Letters Patent No. 623,247.

It is hereby certified that Letters Patent No. 623,247, granted April 18, 1899, upon the application of Charles L. Heermann de Hundertmark, of Paris, France, for an improvement in "Fireproof Material," was erroneously issued to Wilhelm Herbst, of Brunswick, Germany, as assignee of the entire interest in said invention; that said Letters Patent should have been issued *to Emil Thurneyssen, of same place*, said Emil Thurneyssen being the assignee by mesne assignments, of the entire interest in said patent, as shown by the record of assignments in this Office; and that the said Letters Patent should be read with this correction therein that the same may conform to the record of the case in the Patent Office.

Signed, countersigned, and sealed this 2d day of May, A. D., 1899.

[SEAL.]

WEBSTER DAVIS,
*Assistant Secretary of the Interior.*

Countersigned:
C. H. DUELL,
*Commissioner of Patents.*